Figure 10:
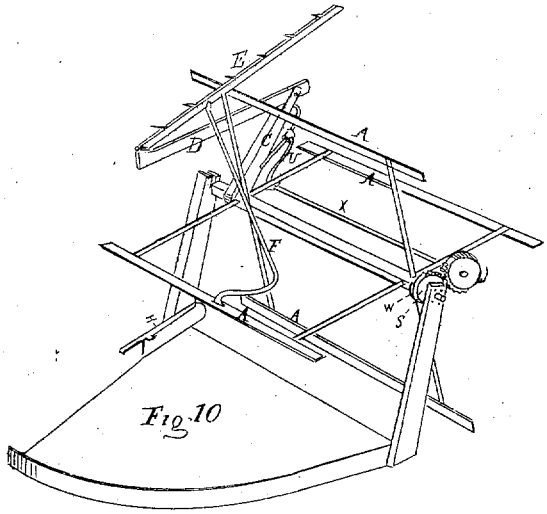
Figure 11:
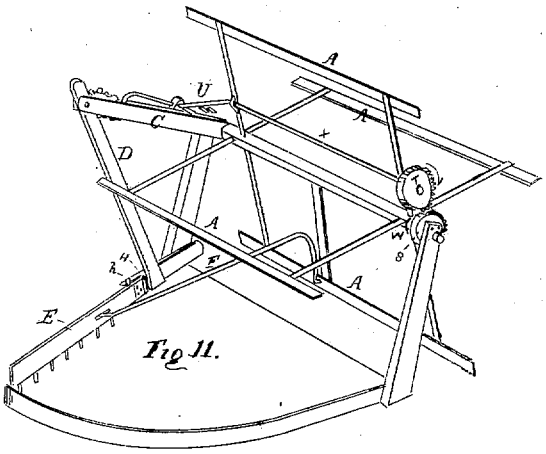
Figure 5:
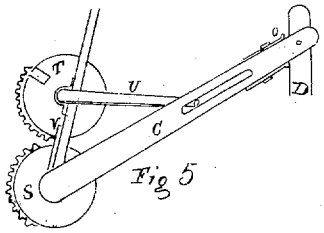
Figure 9:
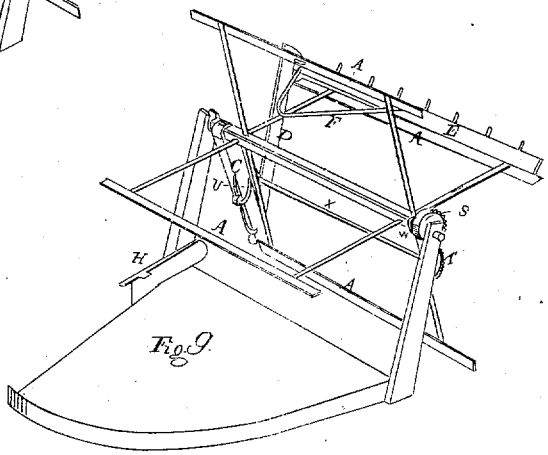

2 Sheets. Sheet 1.
Saml. J. Sherman.
Harvester Rake.
No. 2457 Reissued. Jan. 15. 1867
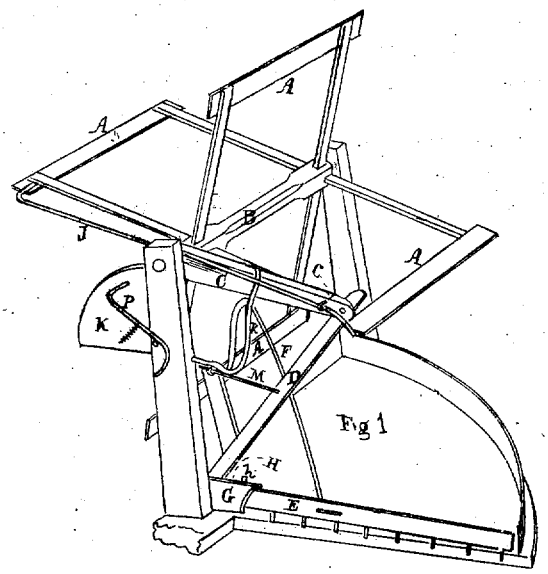
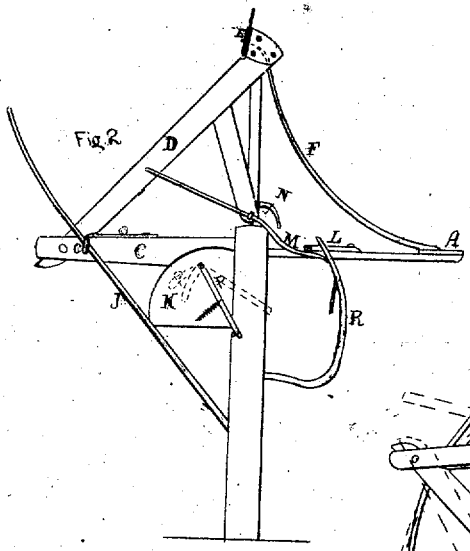
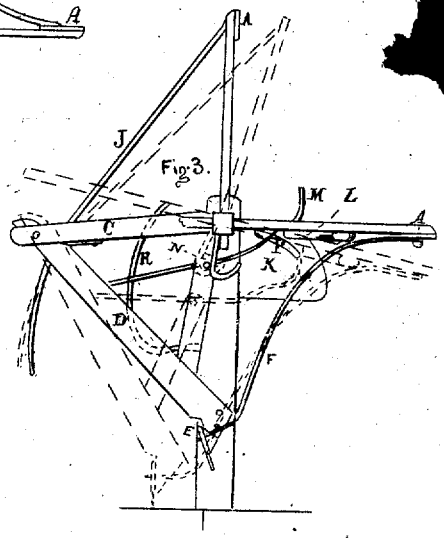
Witnesses
B F Field
Inventors
Saml. Sherman
Jeremiah Sherman
By their atty R. D. Smith 2 Sheets. Sheet. 2.

S. and J. Sherman.
Harvester Rake.

No. 2457 Reissued. Jan. 15. 1867.

Witnesses:
B. F. Hills

Inventors
Saml. Sherman
Prescott Sherman
By their Atty
R. D. Smith

UNITED STATES PATENT OFFICE.

SAMUEL S. SHERMAN AND JEREMIAH G. SHERMAN, OF McHENRY, ILL.

IMPROVEMENT IN HARVESTER-RAKES.

Specification forming part of Letters Patent No. 53,051, dated March 6, 1866; Reissue No. 2,457, dated January 15, 1867.

*To all whom it may concern:*

Be it known that we, SAMUEL S. SHERMAN and JEREMIAH G. SHERMAN, of McHenry, in the county of McHenry and State of Illinois, have invented a new and useful Improvement in Automatic Harvester-Rakes; and we do hereby declare and make known that the following is a full, clear, and exact description of the same, reference being had to the accompanying drawings, and the letters and figures marked thereon, which form part of this specification.

Our said invention relates to that class of automatic harvester-rakes which are attached to and revolve with the reel, and are operated by mechanism connected with the same, as is hereinafter described.

Our invention consists in suspending the rake upon or attaching it to the reel-shaft by means of a jointed arm or its equivalent, so connected with the rake and reel shaft that, at the proper moment, the rake drops down upon the platform behind the sickle, and remains down upon said platform until it shall have swept around, as upon a pivot, one end, and raked the grain into a gavel, and delivered the same at the side of the harvester, as hereinafter more fully described.

Our said invention further consists in attaching a driving-arm for moving the rake upon the platform, so constructed as to allow said rake to swing around to the side of the machine, as aforesaid, to some part of the reel over the platform, so as to operate upon or apply the power to said rake from a point directly behind the same, substantially as hereinafter set forth.

Our said invention further consists in the employment of a rod or arm attached at one end to the reel, and at the other end to the jointed arm which carries the rake, and arranged in connection with a stationary cam, so as to raise up the rake from the platform at the proper time, and fold or arrange it in its position upon the reel, as desired.

Our said invention further consists in the employment, in connection with said reel, jointed arm, and rake, of an automatic catch, which operates at the proper time to secure said rake upon the reel, so that it will remain upon and revolve with the same until the operator, at will, releases said catch.

To enable those skilled in the art to understand how to construct and use our invention, we will proceed to describe the same with particularity, making reference in so doing to the aforesaid drawings, in which—

Figure 4:
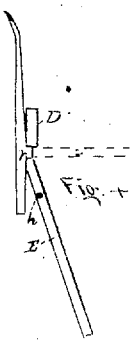
Figure 6:
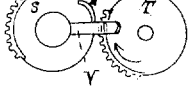
Figure 7:
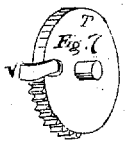
Figure 8:
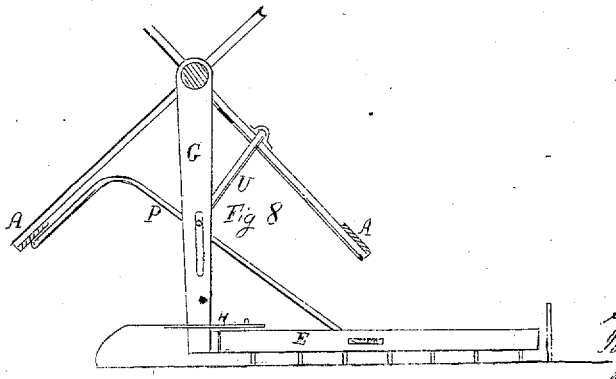

Figure 1 represents a perspective view of our invention. Fig. 2 is an end view or elevation of the same. Fig. 3 is a vertical section, showing the interior of the parts shown in Fig. 2; and Fig. 4 is a plan view of the check-plate and part of the rake-head, herein after described.

Similar letters of reference in the several figures denote the same parts of our invention.

A represents the wings of the reel, and may be made in any of the ordinary methods. Upon the inner end of the reel-shaft B an arm, C, is attached, the end of the shaft passing through a sleeve upon the end of said arm, so that said arm may have a free motion upon and about said shaft, and the shaft may have an independent motion within said sleeve, as desired.

Instead of the mode herein set forth of attaching said arm to the reel-shaft, the desired results may be attained by attaching it thereto in any other manner, provided a hinge or joint is secured at that point. At its outer end the said arm C is jointed to an arm, D, and to the outer or lower end of the latter is joined the rake-head E.

F represents an arm, connected at one end to the rake-head, as shown, and at the other to one of the reel-bars, or some other point upon the reel, whereby the revolution of said reel forces the rake in its desired sweeping movement, carrying the grain to the side of platform, as aforesaid.

The platform to be used with our rake is the ordinary quadrant-formed platform, to any of which it is adapted.

Upon that side of the platform nearest the driving mechanism is a guard, G, and upon its upper edge is a check-plate, (marked H,) which serves the purpose of holding the inner end of the rake in a fixed position, while the outer end sweeps around upon the platform to deposit the grain at the side thereof, as desired.

The normal position of the rake upon the reel is shown in Fig. 2, where it lies extended along the edge of one of the reel wings or bars, and is maintained in this position during a part of the revolution of the reel, and until the rake is carried down just above and to the rear of the sickle, at which point it is released, and drops down upon the platform, said motion being permitted by the hinged joint of the arms C D, to permit which motion is the object of said joint or its equivalent.

When the rake drops down upon the platform, as aforesaid, the arm F, connected with the reel, as before mentioned, immediately pushes the rake backward, and, as one end of the rake is checked at the check-plate H around upon the quadrantal platform, delivering the grain at the side, as desired, when the rake is retracted and arranged upon the reel and secured thereto, as before, ready to repeat the operation.

It will be observed that the reel is revolving all the time while the rake remains down upon the platform.

The device which renders this possible consists in the hinging of the bar C to the reel-shaft, allowing the shaft to revolve without carrying up the arm C, and thus permitting the rake to remain upon the platform as long as desired.

If the reel should be made large enough in diameter so that its revolution would carry the rake down upon the platform without being dropped from the reel, as above mentioned, then the joint between C and D would be unnecessary.

We will now describe the device herein shown for retracting the rake from the position shown in Fig. 1, and arranging it as shown in Fig. 2.

At the outer end of the arm C is a loop or staple, (marked *c*,) through which a rod or arm, J, passes, the opposite end of the said arm J being attached at one end of the reel, or some device revolving therewith, as shown, at a point opposite the bar upon which the rake is to be arranged.

Just as the rake reaches the position shown in Fig. 1, the heel of the rake is released from the check-plate, and as the reel continues to revolve, the rod J is pressed down upon a cam, K, upon the reel-post, which, as the reel revolves, raises up the said rod J, and brings it to the position indicated in Fig. 2, which has the effect to raise up the rake, and the driving-arm F has the effect to fold the rake down upon the reel-bar, as shown in Fig. 2.

To retain the rake and arms C D in the last-described position, any device or catch may be used, which may be attached and released automatically at the proper moments.

For this purpose we have shown the latch L in connection with a holding-rod, M, and pin and shoulder N.

O represents a metallic adjustable gage, which prevents the arms C and D from folding together when arranged as seen in Fig. 2, and thus prevents the rake from dropping down upon or toward the reel-shaft, being so adjusted as to hold the end of the arm D at the end of the reel-wing, upon which the rake is designed to be folded.

The arm D cannot turn upon its hinge with C, so as to let the rake off from the reel, for the reason that the latch L holds the rod M, which is attached at its opposite end to said arm D.

The arms C and D cannot move together backward, because the pin and shoulder N interpose in that direction; nor can they move together forward by reason of the aforesaid latch L.

The rake, having thus been arranged and secured upon the reel, would continue to revolve with the reel, and not operate to rake the grain from the platform, unless some means were provided to release the rake at the proper time from its described position upon the reel.

To enable the operator to release the rake at pleasure from the reel, we may employ various devices, and in the drawings have shown one means of accomplishing the desired result.

P represents a cam, arranged in such a position that when the rake has reached that position where it is desired to release the rake, the latch L comes in contact therewith, as shown in Fig. 3, and is thereby pushed aside, so as to release the rod M, which, at this point, is the only thing which supports the rake, so that when said latch is released the rake drops down upon the platform of its own weight, and is operated by the arm F, as hereinbefore set forth, the lower end of the bar D engaging with the check-plate H, and retaining the end of the rake attached thereto, as aforesaid, until the rake has delivered the grain at the side of the machine, when a pin, *h*, upon the rake-head comes in contact with the check-plate, and becomes the center of motion instead of the hinge of the rake to the arm D, which is thus moved out from check, and the rake released to be retracted, as before mentioned.

As soon as the rake has been arranged upon the reel, as before described, the latch L engages with the concave side of the cam R, and is thereby forced over the rod M, as shown in Fig. 2, which secures the rake in place until again released by the effect of the cam P, hereinbefore described.

The cam P is adjustable, and can be moved back from its ordinary position, so that the latch will not come in contact therewith, so that the rake may be allowed to revolve with the reel as many times as may be desired without raking, as in light grain the time occupied in making two or three revolutions of the reel may be necessary to collect upon the platform enough grain to make a gavel or bundle of the required size.

Many devices may be used for raising the rake from the platform and securing it upon the reel automatically, so as to be detached automatically, or otherwise, at the proper time, and we do not therefore intend to limit ourselves to the devices herein shown and described.

Having described the construction and operation of our invention, we will now specify what we claim, and desire to secure by Letters Patent.

We claim—

1. Providing the arm C D, which attaches the rake to the reel, with an elbow or joint which allows the rake at the proper time to drop down from the reel upon the platform, substantially as and for the purposes herein specified.

2. In combination with the rake, an arm with one end attached to the rake, and the other end attached to a reel-arm, or its equivalent, directly behind the rake, and operating upon the rake, so as to cause it to sweep the platform in an ar cof a circle, while one end of the rake is held stationary, or nearly so, substantially as and for the purpose described.

3. The employment of the rod J and cam K, in combination with the reel and arm C D, for the purpose of raising the rake up from the platform when desired, and arranging it upon the reel, as and for the purposes specified.

4. In combination with said reel, jointed arm, and rake, an automatic catch operating in connection therewith, so as to secure the rake to the reel until released therefrom, substantially in the manner described.

SAMUEL S. SHERMAN.
JEREMIAH G. SHERMAN.

Witnesses:
W. E. MARRS,
L. L. COBURN.